Oct. 21, 1969    I. F. KEMP    3,473,614

AGRICULTURAL AND LIKE MACHINES

Filed Oct. 27, 1966    6 Sheets-Sheet 5

Oct. 21, 1969     I. F. KEMP     3,473,614
AGRICULTURAL AND LIKE MACHINES
Filed Oct. 27, 1966     6 Sheets-Sheet 6

United States Patent Office 3,473,614
Patented Oct. 21, 1969

3,473,614
AGRICULTURAL AND LIKE MACHINES
Ivor Frederick Kemp, Hitchin, England, assignor to National Research Development Corporation, London, England, a corporation of Great Britain
Filed Oct. 27, 1966, Ser. No. 589,953
Claims priority, application Great Britain, Nov. 2, 1965, 46,476/65
Int. Cl. A01d 25/02, 23/00, 19/00
U.S. Cl. 171—61   10 Claims

ABSTRACT OF THE DISCLOSURE

A machine for harvesting and topping root crops, e.g., carrots, comprises an endless belt conveyor system by which the crops are carried from the ground and introduced between a pair of rollers located beneath the conveyor system. The arrangement of the rollers in relation to the belts is such that, in operation, the root portion of the crop is drawn upwardly into contact with the rollers. One of the rollers has a helical ridge cooperating with the other roller to define a nip which on rotation of the rollers is effective to cut off the foliage of the crop from the root portion with a shearing action.

---

This invention relates to agricultural and the like machines for harvesting and/or lifting root crops particularly those, such as carrots, early potatoes and beets, which have appreciable foliage at the time of harvesting.

An implement of this kind, utilising a gripping-belt conveyor, is described and illustrated in commonly assigned co-pending patent application Ser. No. 373,234, filed June 8, 1964, now U.S. Patent No. 3,366,184, dated Jan. 30, 1968. In that implement, the gripping-belt conveyor co-operates with a rotary disc type of share so that when the root has been loosened and/or raised by the share, the belts grip the foliage and lift the root from the ground. In such implements the foliage has to be removed from the roots at a higher level and difficulty is experienced because of the random positioning of the root with respect to the belt so that, for automatic removal of the foliage as a reasonable distance from the root, the roots have to be levelled off in the conveyor. Thus two spaced bars can be provided lying in a plane which diverges downwardly and rearwardly from the line of the belts, these bars engaging the roots and dragging the foliage downwardly between the belts, if necessary, to align the roots ready for the action of some cutting device. However, for a densely sown crop the foliage of the different roots is too compacted for this to be fully effective.

An object of the present invention is the provision of an improved machine adapted for the harvesting of root crops which at harvesting include a substantial amount of top foliage, and for cropping that foliage from the harvested crop.

According to the present invention, a machine adapted for the harvesting of root crops which at harvesting include a substantial amount of top foliage, comprises an arrangement of two endless conveyor belts arranged with parts which face one another and are biassed together to provide an upwardly and rearwardly inclined common run, the lower end of the run being disposed near the earth so that in use the foliage of the root crops is gripped between the belts and so that as the belts are driven to travel upwardly and rearwardly in the common run they lift the root crop by its foliage, and below the upwardly and rearwardly inclined common run of the two belts a power driven rotatable roller the periphery of which is provided with a helical ridge, and a further member co-acting with the rotatable roller to form below that common run a "nip" through which the rotatable roller can feed foliage upwardly but which prevents the upward movement of the root crop beyond the roller, whereby in use the root crop is first drawn upwardly by the roller by its foliage until it engages the roller and then is severed from its foliage by a shearing action by the ridge.

The invention will be described, by way of example, with reference to the accompanying partly diagrammatic drawings, in which.

Figure 6:
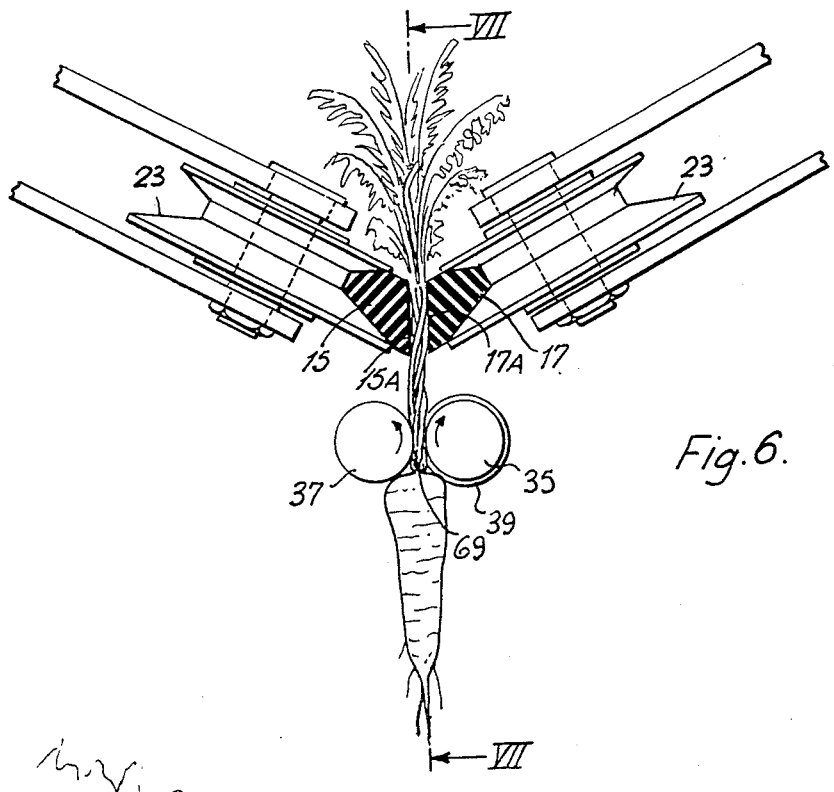
FIGURE 6 is a sectional end elevation taken on the line VI—VI of FIGURE 2 and shows the belt conveyor and the topping device.

The harvester-conveyor 1 is mounted by columns 3 and 5 on the chassis 7 of a double-rotary-disc-share harvesting machine 9. This machine includes two power driven rotary share discs 11, the direction of rotation of which is such that their lower parts move in a direction opposite to that in which the tractor 13 travels over the ground. The actual conveyor is in the form of two facing endless belts 15 and 17, and the planes of these two belts are inclined to one another, as is shown in FIGURE 6, so that the lower end of the conveyor can extend downwardly into the space between the two share discs 11, which are themselves inclined so that their planes converge downwardly, to a position close to the earth. The two endless belts 15 and 17 are basically V-belts and are carried by V-belt pulleys 19 at their lower ends, by pulleys 21 at their upper ends, and by a number of intermediate pulleys 23 which are biassed by springs 25 so that the facing parts of the belts are firmly held against one another. These facing parts of the belts are formed with inclined faces 15A and 17A respectively, as is shown in FIGURE 6, so that in use the two belts can engage over an appreciable transverse width.

The two upper pulleys 21 are power driven by a power take-off from the towing tractor 13, which power take-off also drives the share discs 11. The power take-off further drives through a gear box 27, a shaft 29 provided at each end with a universal joint 31, and a chain drive 33, a roller 35 which, with a second roller 37, forms in conjunction with the conveyor belts a carrot topping device. The facing parts of the two belts 15 and 17 in the common run move rearwardly at a speed about twice that of the tractor 13.

Roller 35 increases progressively in diameter from its lower end 35A to its upper end 35B, and is provided with a sharp-edged helical ridge 39 having a height of ⅛ inch and which, as the roller is rotated by the tractor power take-off, tends to move anything in contact with the roller axially of the roller towards its upper end. Roller 35 is carried at its two ends by bearings at 41 and 43 and is supported by a frame 45 fixed to the frame of the conveyor 9. Roller 35 is driven at about 200 revolutions per minute, the speed depending upon the speed of the tractor engine and thus being related to both the tractor speed over the land and the speed of the two belts 15 and 17. Gear boxes in the transmissions between the engine and the tractor road wheels, the conveyor drive pulleys, and the roller 35 do permit optimum speeds for each of these three to be selected.

Figure 5:
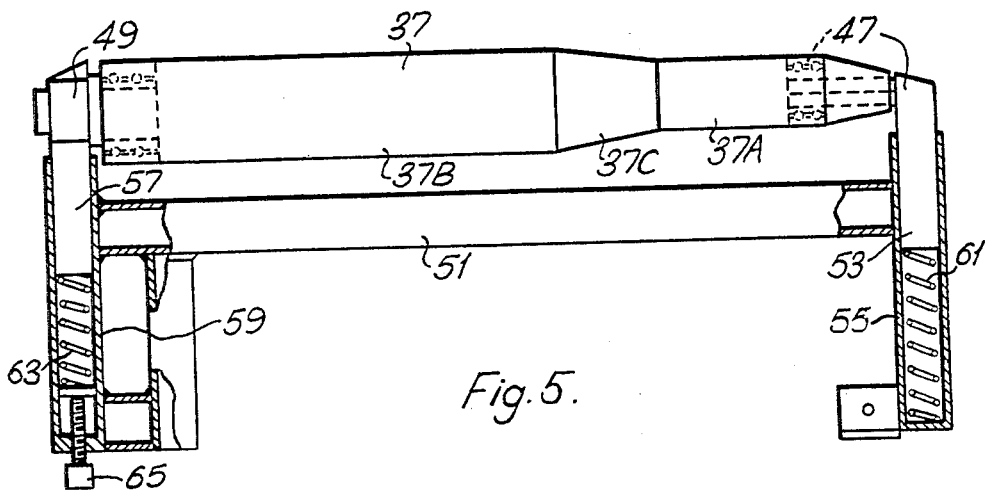
FIGURE 5 is an underneath view of a roller shown in FIGURE 4, the mounting means for this roller being broken away to show in section their construction.
Figure 8:
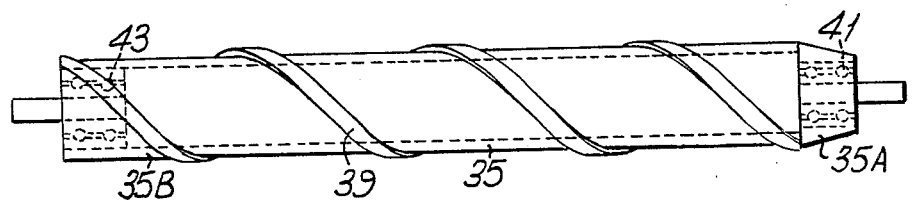
FIGURE 8 is an underneath view of a second roller shown in FIGURE 4.

Roller 37 includes a lower part 37A of smaller diameter and an upper part 37B of larger diameter, the two parts being connected by a transition part 37C of progressively icnreasing diameter. The part 37B is disposed sufficiently close to the roller 35 to provide a shearing reaction member therefor. Roller 37 is rotatably mounted at its two ends in bearings 47 and 49 carried by a frame 51 fixedly carried by the conveyor frame. Thus as shown in FIGURE 5 bearing 47 is provided on a plunger 53 axially slidable in part 55 of frame 51, and bearing 49 is provided on a plunger 57 axially slidable in part 59 of frame 51. The two plungers 53 and 57 are biased outwardly of the frame 51 respectively by two compression springs 61 and 63, and the compression of spring 63 is variable by an adjusting screw 65.

The two rollers 35 and 37 lie both in a common plane which is inclined rearwardly and upwardly of the conveyor 9 at a lesser angle than are the conveyor belts 15 and 17, so that the distance between the belts and the "nip line" 69 between the two rollers progressively increases towards the upper end of the conveyor. The angle between the plane and the belts can be about 10 degrees. This arrangement brings the leading ends of the rollers close to the two belts so that all the carrots do pass below the "nip line," and does increase the room available for driving the other end of roller 35.

The lower part of the conveyor is provided with guide blades 71 which are arranged to direct the foliage of any root crop being harvested into the space between the two share discs 11.

In use of the carrot harvesting and topping machine described above, the tractor proceeds across the field of carrots to be harvested at a speed of two to three miles per hour. The carrots, by way of example, may be sown in groups of three rows at a row-to-row pitch of three inches, with the groups spaced apart at a pitch of thirty inches to leave ample room for a tractor wheel between two adjacent groups. The guide blades 71 embrace three adjacent rows of carrots forming one group and direct the carrot foliage between the two share discs 11. These share discs loosen the earth surrounding the carrots so the as the foliage is gripped between the two endless belts 15 and 17, the carrots are lifted from the loosened earth and move upwardly with the conveyor belts. Some idea of the rate of handling of the carrots is given by the fact that about 100 carrots per second are harvested in this manner.

In practice, the carrots will be mixed in size and in their depth in the earth, so that as picked up by the belts the crowns of the carrots will be unevenly disposed vertically with respect to the belts. It is this fact that makes it difficult for any automatic machinery properly to top the carrots, i.e., to separate the foliage from the carrot proper without damaging the crown of the carrot and without leaving any appreciable length of foliage attached to the topped carrot.

Figure 7:
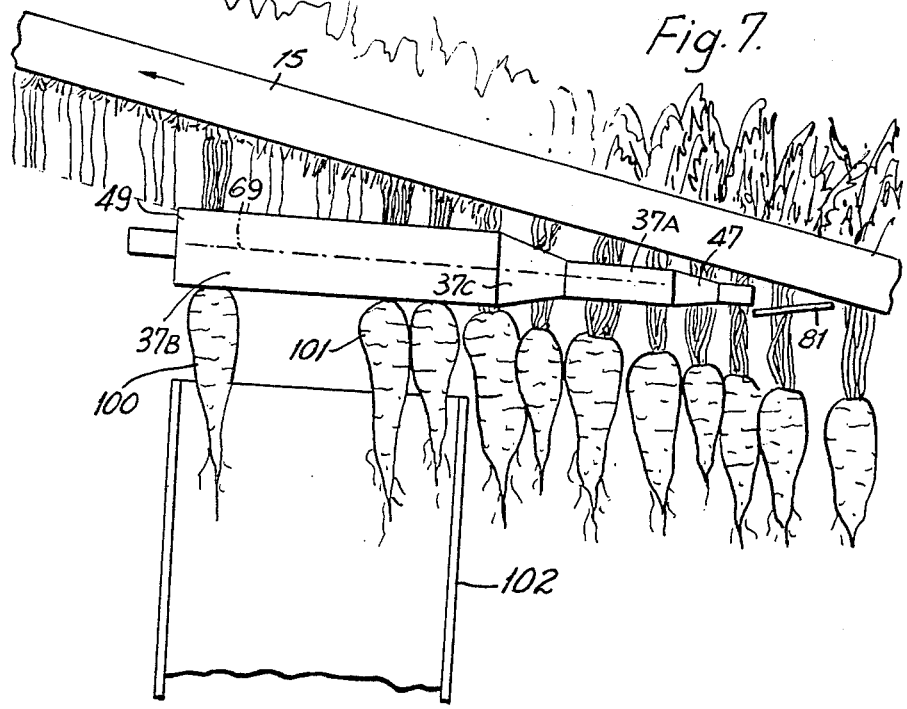
FIGURE 7 is a sectional side elevation taken on the line VII—VII of FIGURE 6.

The two rollers 35 and 37 have their lower ends arranged very close to the two belts 15 and 17 so that all the carrots will lie below the nip of the two rollers, and if desired two short bars 81 shown in FIGURE 7 can be added, arranged with their forward ends substantially touching the belts 15 and 17 and with their rearward ends below the nip line of the two rollers 35 and 37. The utility of the part 37A of reduced diameter of the roller 37 is that it provides an entry throat which ensures that the foliage of all the carrots enters the space between the two rollers. Since the roller 35 is power driven in the direction indicated, and since roller 37 is free to turn with roller 35, the carrot foliage is fed upwardly between the two rollers until the carrots themselves come into contact with the rollers. In this way, all the carrots are first drawn up into contact with the rollers. Next, since the helical ridge 39 tries to impart to the carrots a movement lengthwise of the rollers which is faster than the rate of travel of the belts, the edge of this ridge by a shearing action cuts through the foliage. The severed carrot falls down into a disposal chute, (102 in FIG. 7) and the severed foliage is carried rearwardly through a short distance and then is discarded as the two belts 15 and 17 separate to pass round the upper pulleys 21.

One of the problems which arises in harvesting root crops such as carrots is that some of the carrots will have been "early" and will have turned into what are known as "bolters." A "bolter" is a plant which, having completed its root formation, has thickened its main stem as a first stage is going to seed. This main stem is relatively thick and tough and is difficult to cut. With the arrangement of belts and rollers shown, a "bolter" will not have its root severed from its top foliage, but will pass unimpeded out past the rearmost ends of the two rollers, and will be discarded with its top foliage to lie on the ground after the harvester has passed. This is important from the point of marketability of the crop, since topped such a carrot tends to look like a normal carrot, but when cooked it is found to have a tough inedible core. A harvester which discards "bolters" therefore is advantageous. Two such "bolters" are shown at 100 and 101 in FIG. 7. These "bolters' will pass unimpeded out past the rearmost ends of the rollers, still supported by the grip of the belts 15, 17 on their foliage until the belts part adjacent the pulleys 21. As illustrated in FIG. 7, the two intervening carrots have already been separated from their foliage, and have dropped down into disposal chute 102.

Figure 1:
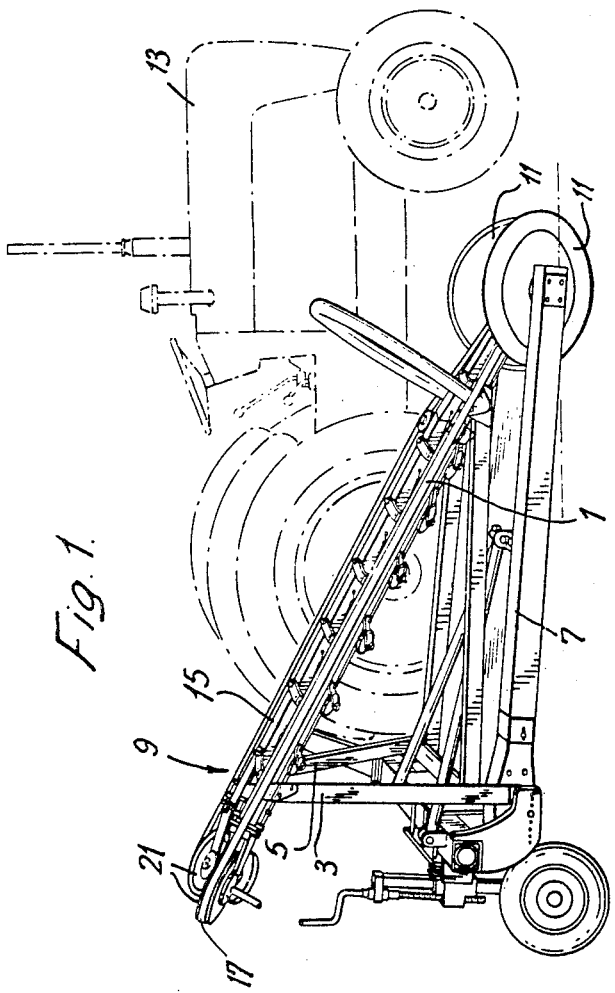
FIGURE 1 is a side elevation of a side-mounted harvester-conveyor, the operating tractor being shown in chain dotted outline.
Figure 2:
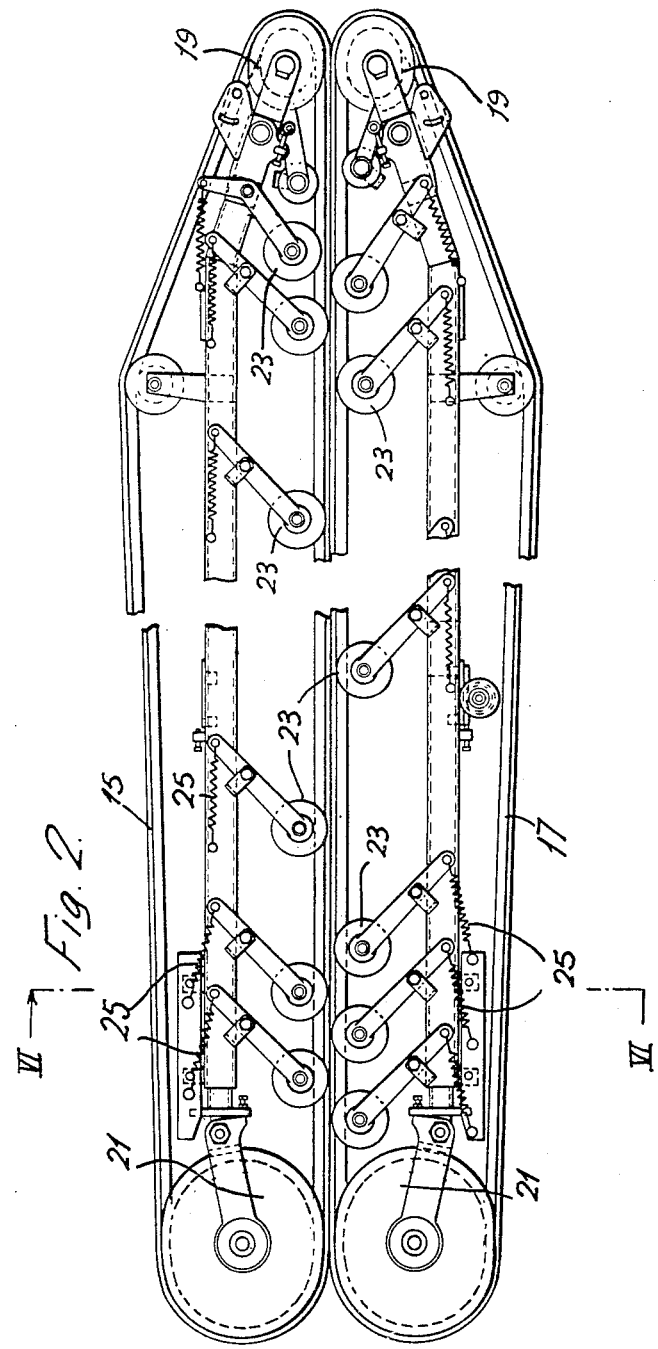
FIGURE 2 is a plan view of a double-belt conveyor shown in FIGURE 1.
Figure 3:
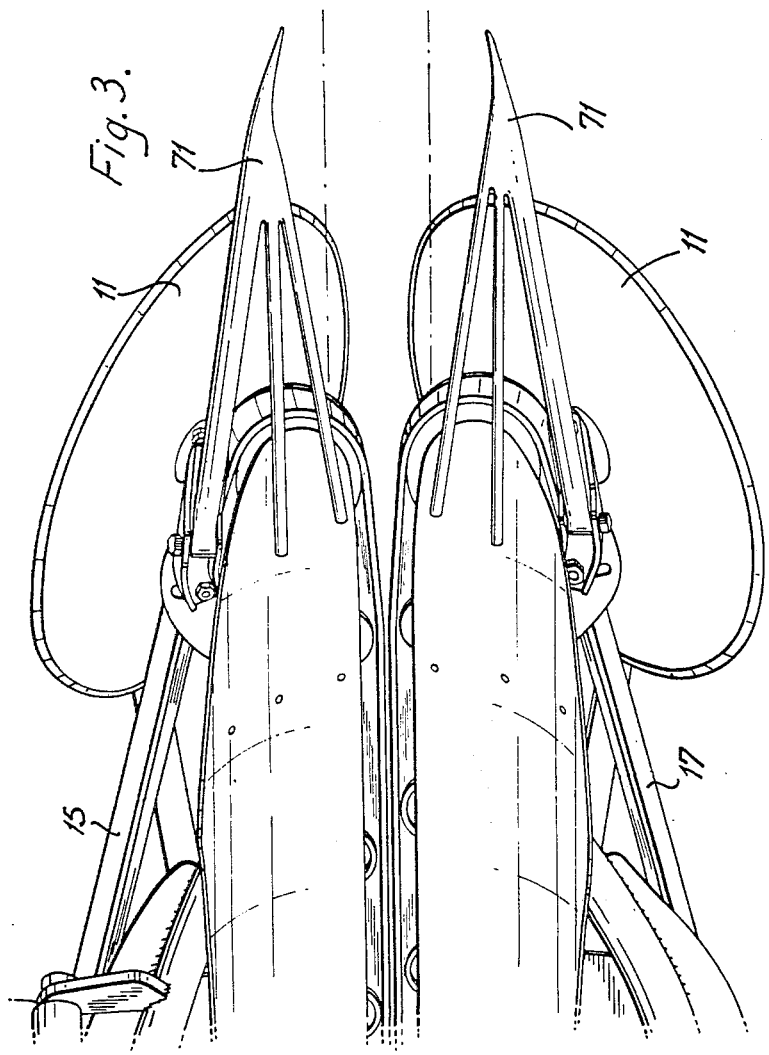
FIGURE 3 is a plan view of a lower part of the conveyor shown in FIGURES 1 and 2.
Figure 4:
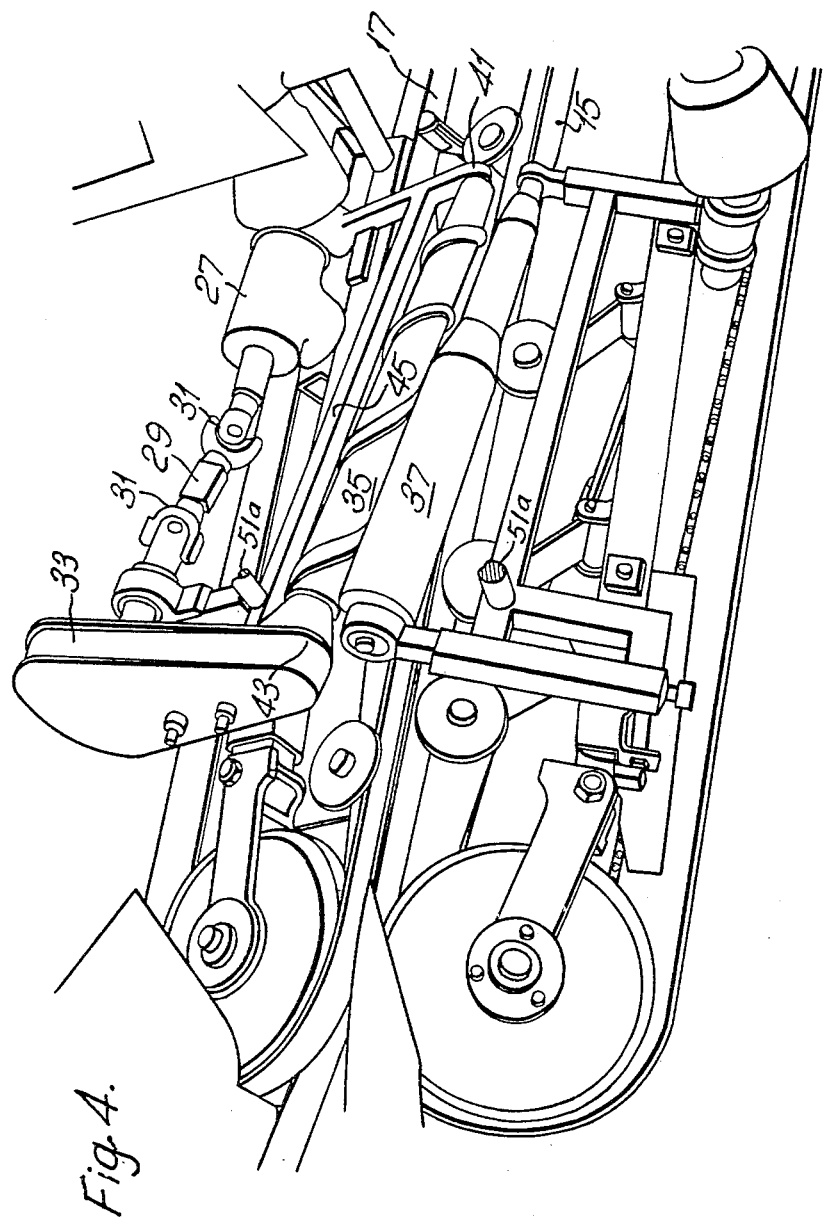
FIGURE 4 is an underneath view of the upper end of the conveyor shown in FIGURES 1 and 3 and shows a device for topping root crops such as carrots harvested by the harvester-conveyor.

In order that "bolters" may be discarded in this manner, it is convenient for the second roller to be an idler roller, so that no drive connection is required between them which would impede the discharge of the "bolters" past the rearward ends of the two rollers. However, in some cases, where weeds are present which tend to accumulate between the two rollers and tend to force them apart, a brace or strap between the case of the chain drive 33 and the frame 51 may be provided to prevent this taking place. Such a brace can be U-shaped to extend below the carrots being topped, as shown broken at 51a in FIG. 4.

I claim:

1. A machine adapted for the harvesting of root crops which at harvesting include a substantial amount of top foliage, comprising:

(a) a first endless belt;
(b) a first system of pulleys by which the belt is supported with part of its length disposed in a vertical plane and inclined to the horizontal in that plane;
(c) a second endless belt;
(d) a second system of pulleys by which the second belt is supported with part of its length disposed in a vertical plane and inclined to the horizontal in that plane; this part of the belt lying opposite and facing the said part of the first belt;
(e) spring biassed pulley means arranged to press the said part of the first belt into gripping contact with the said part of the second belt;
(f) driving means by which the said belts are caused to move continuously so that the said facing parts of the first and second belts move together upwardly and rearwardly at the same speed to convey root crops gripped between the two belts;
(g) a first rotatably mounted roller disposed below the said parts of the first and second belts;
(h) a helical ridge provided on the first roller;
(i) driving means by which that first roller is continuously rotated;
(j) a further member coacting with the rotatable roller and disposed sufficiently close to said first roller to provide a shearing reaction member and to form below the said parts of the two belts a "nip" through which the first roller can feed foliage upwardly but which prevents the upward movement of the root crop beyond the roller; whereby in use the root crop is first gripped by its foliage between said belts, the foliage is passed into said "nip," and the root crop is drawn upwardly and rearwardly by the roller by its foliage until it engages the roller and then is severed from its foliage by a shearing action by the ridge.

2. A machine according to claim 1, in which the axis of the roller is inclined relatively downwardly away from the axis of the said parts of the belts, in the direction of movement of the belts.

3. A machine according to claim 2, in which the angle of inclination of the rotatable roller to the belt axis is about 10 degrees.

4. A machine according to claim 1, in which the helical ridge has a radial height of about ⅛ inch.

5. A machine according to claim 1, in which the diameter of a short initial part of the rotatable roller increases progressively in the direction of travel of the crops along the roller.

6. A machine according to claim 1, in which the further member is a second rotatable roller.

7. A machine according to claim 6, in which the second roller is an idler roller.

8. A machine according to claim 6, in which the second roller includes an initial part, first engaged by the root crop, of lesser diameter, and a main part, subsequently engaged by the root crop, of greater diameter.

9. A machine according to claim 1, in which spring means bias the further member towards the rotatable first roller.

10. A machine according to claim 1 wherein said driving means for the first roller rotates the roller at a rate such that said helical ridge tries to impart to the foliage of the root crops a movement lengthwise of the roller substantially faster than the rate of travel of said belts in the direction of that movement.

References Cited

UNITED STATES PATENTS

| | | | |
|---|---|---|---|
| 1,142,050 | 6/1915 | Moore | 171—28 |
| 1,905,194 | 4/1933 | Urschel | 171—61 |
| 2,534,685 | 12/1950 | Shrader | 56—104 XR |
| 2,562,400 | 7/1951 | Urschel | 171—61 XR |
| 3,222,852 | 12/1965 | Ward et al. | 56—104 |
| 3,366,184 | 1/1968 | Hawkins et al. | 171—61 |

ANTONIO F. GUIDA, Primary Examiner

U.S. Cl. X.R.

56—104; 171—28